United States Patent
Wahabzada et al.

(10) Patent No.: US 11,140,891 B2
(45) Date of Patent: Oct. 12, 2021

(54) APPLICATION OF FLUIDS

(71) Applicant: BASF Agro Trademarks GmbH, Ludwighafen am Rhein (DE)

(72) Inventors: Mirwaes Wahabzada, Bonn (DE); Ole Peters, Düsseldorf (DE); Walter Mayer, Wuppertal (DE); Bernhard Grimmig, Verden (DE)

(73) Assignee: BASF Agro Trademarks GmbH, Ludwigshafen am Rhein (DE)

( * ) Notice: Subject to any disclaimer, the term of this patent is extended or adjusted under 35 U.S.C. 154(b) by 204 days.

(21) Appl. No.: 16/463,020

(22) PCT Filed: Nov. 16, 2017

(86) PCT No.: PCT/EP2017/079437
§ 371 (c)(1),
(2) Date: May 22, 2019

(87) PCT Pub. No.: WO2018/095800
PCT Pub. Date: May 31, 2018

(65) Prior Publication Data
US 2020/0060254 A1 Feb. 27, 2020

(30) Foreign Application Priority Data
Nov. 23, 2016 (EP) .................... 16200158

(51) Int. Cl.
*A01M 7/00* (2006.01)
*A01B 79/00* (2006.01)
(Continued)

(52) U.S. Cl.
CPC ......... *A01M 7/0092* (2013.01); *A01B 79/005* (2013.01); *A01M 7/005* (2013.01);
(Continued)

(58) Field of Classification Search
CPC .. A01M 7/0092; A01M 7/0042; A01M 7/005; A01M 7/0053; A01B 79/005;
(Continued)

(56) References Cited

U.S. PATENT DOCUMENTS 5,433,380 A * 7/1995 Hahn .................. A01M 7/0085
239/104
6,036,107 A * 3/2000 Aspen ................. A01M 7/0089
239/159
(Continued)

FOREIGN PATENT DOCUMENTS

DE 102004047585 A1 3/2006
DE 102010018338 A1 10/2011
(Continued)

OTHER PUBLICATIONS

U.S. Appl. No. 16/332,833, filed Mar. 13, 2019.
(Continued)

*Primary Examiner* — Steven J Ganey
(74) *Attorney, Agent, or Firm* — Lowenstein Sandler LLP

(57) ABSTRACT

The present invention relates to the application of a concentrate in diluted form. Subject matters of the present invention are a device and a method for application of a concentrate in diluted form. A further subject matter of the present invention is use of the device according to the invention in the area of agriculture, in particular for treating cultivated plants with plant protection agents and/or nutrients.

14 Claims, 2 Drawing Sheets

Figure 1:
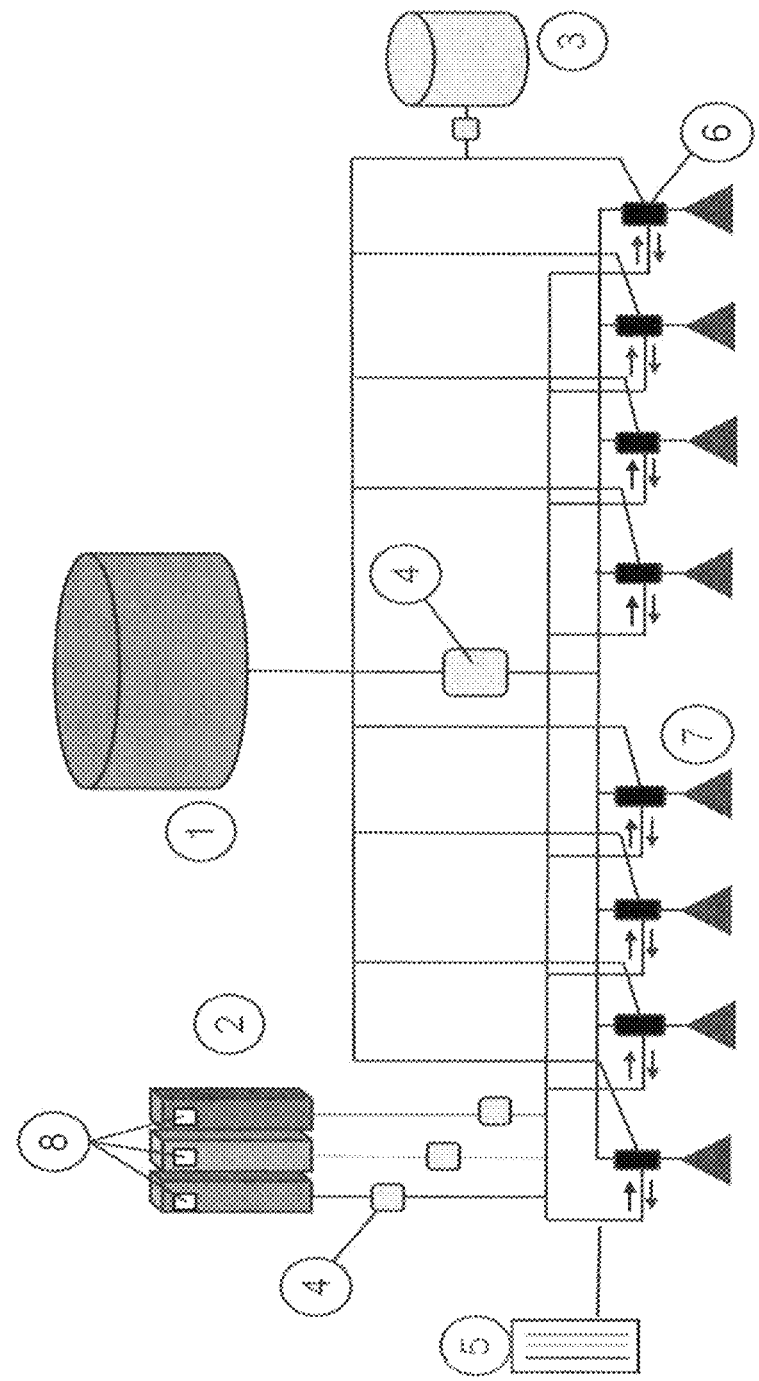

(51) Int. Cl.
  *B05B 9/08* (2006.01)
  *B05B 15/50* (2018.01)
  *B05B 15/55* (2018.01)
  *B05B 7/24* (2006.01)
(52) U.S. Cl.
  CPC ........ *A01M 7/0042* (2013.01); *A01M 7/0053* (2013.01); *B05B 7/2472* (2013.01); *B05B 9/08* (2013.01); *B05B 15/50* (2018.02); *B05B 15/55* (2018.02); *B01F 2215/0009* (2013.01)
(58) Field of Classification Search
  CPC ........... B05B 9/08; B05B 15/50; B05B 15/55; B05B 7/2472; B01F 2215/0009
  USPC .......... 239/11, 124, 127, 104, 106, 159–167, 239/303–305
  See application file for complete search history.

(56) References Cited

U.S. PATENT DOCUMENTS

| | | | | |
|---|---|---|---|---|
| 7,124,961 | B2* | 10/2006 | Wilting | A01M 7/0089 239/124 |
| 8,191,798 | B2* | 6/2012 | Hahn | A01C 23/007 239/127 |
| 2014/0252111 | A1 | 9/2014 | Michael et al. | |
| 2014/0263731 | A1 | 9/2014 | Qin et al. | |
| 2018/0295771 | A1 | 10/2018 | Peters | |
| 2019/0174739 | A1 | 6/2019 | Peters et al. | |
| 2019/0191617 | A1 | 6/2019 | Hoffmann et al. | |
| 2019/0208762 | A1 | 7/2019 | Schafer et al. | |
| 2019/0246549 | A1 | 8/2019 | Peters et al. | |

FOREIGN PATENT DOCUMENTS

| | | | |
|---|---|---|---|
| EP | 1378293 | A1 | 1/2004 |
| FR | 3003187 | A1 | 9/2014 |
| WO | WO-9501719 | A1 | 1/1995 |
| WO | WO-0023937 | A1 | 4/2000 |
| WO | WO-2008097283 | A1 | 8/2008 |
| WO | WO-2013063415 | A1 | 5/2013 |

OTHER PUBLICATIONS

U.S. Appl. No. 16/307,967, filed Dec. 7, 2019.
U.S. Appl. No. 16/339,418, filed Apr. 4, 2019.
European Search Report for EP Patent Application No. 16200158.0, dated Jun. 12, 2017.
International Search Report for PCT/EP2017/079437 dated Mar. 5, 2018.
Written Opinion of the International Searching Authority for PCT/EP2017/079437 dated Mar. 5, 2018.

* cited by examiner

APPLICATION OF FLUIDS

CROSS-REFERENCE TO RELATED APPLICATIONS

This application is a national stage application (under 35 U.S.C. § 371) of PCT/EP2017/079437, filed Nov. 16, 2017, which claims benefit of European Application No. 16200158.0, filed Nov. 23, 2016, both of which are incorporated herein by reference in their entirety.

The present invention relates to the application of one or a plurality of concentrates in diluted form. Subject matters of the present invention are a device and a method for application of one or a plurality of concentrates in diluted form. A further subject matter of the present invention is use of the device according to the invention in the area of agriculture, in particular for treating cultivated plants with plant protection agents and/or nutrients.

Plant protection agents are used throughout the world for protecting plants or plant products from harmful organisms or preventing the action thereof, destroying unwanted plants or plant parts, inhibiting the unwanted growth of plants or preventing such growth, and/or in another manner for affecting the physiological processes of plants (e.g. growth regulators). Plant protection agents are thus used to secure or increase the yield of agricultural plant products.

Plant protection agents are subject to restrictions on use that can pertain to the time, place, and purpose of application. Basic components of any regulation for use are the approved application amount per unit area and the crop or non-crop that may be present at the time of application to the corresponding area. In addition, the object (indication) that is to be controlled and must therefore be present is a necessary criterion for application to the corresponding area.

An additional problem in plant protection is the risk of resistance formation to individual active compounds, for example by insects, weeds, and fungi.

Accordingly, plant protection agents should be used only when required and only in the respective amounts necessary. An important cornerstone of resistance management is to vary the active compounds used. Documentation of which active compounds are used and the amounts thereof is particularly important for this purpose.

The nutritional requirement of plants can also vary locally. On the one hand, the soil conditions may vary over particular areas, with the result that certain areas have fewer nutrients available than others. Historical differences in utilization of partial areas can also lead to differing requirements for nutrients. On the other hand, it may be the case that because cultivated plants grown in certain areas are underdeveloped (e.g. as a result of local weather damage), it is not economically feasible to invest in these areas at all or to invest in them to the same extent as the favorable partial areas, with the result that the use of nutrients in this case may be reduced or is even unprofitable.

The term precision agriculture (precision farming) refers to site-specific and targeted farming of agricultural areas. The goal is to take into account the differences in the soil or the amounts supplied to the plants and thus the productivity within a field.

Various approaches for the selective use of plant protection agents and nutrients have been published in recent years.

For example, unexamined patent application WO95/01719 describes a computer system by means of which the field is first divided into several zones that are monitored independently of one another. The field is then irrigated and treated with "chemicals" according to the individual zones depending on the requirements determined by the monitoring.

WO 00/23937 also describes a computer system. A component of the computer system is a digital map of an agricultural field that is based on a photographic image and includes the geographic latitude and longitude coordinates, thus allowing positional determination. A user can define zones on this digital map. The user can assign to particular zones formulations of substances (fertilizers, plant protection agents) and the amounts of these substances to be applied. The computer system then generates a so-called application map. This application map allows the farmer to take the various zones of the agricultural field into consideration in applying the substances in a corresponding manner and to apply pre-assigned amounts of corresponding formulations to the individual zones. This method can be referred to as an offline method; an application map is first prepared, and this map is then used offline in the field.

WO 2008/097283A1 discloses a device for the application of plant protection agents and/or nutrients equipped with a sensor that can determine the local requirement of plants in the field. While the device moves through the field, the requirement is determined locally, and the amounts of plant protection agents and/or nutrients required to meet the determined requirement are applied. This method can be referred to as an online method. As the amounts of plant protection agents and/or nutrients to be applied are not known in advance, it may be necessary to apply greater amounts in order to avoid a ease in which the amounts supplied are insufficient to meet the determined requirement. Residual amounts may accumulate in such a case in particular.

For applying plant protection agents and nutrients, agricultural machines are used that ordinarily have a tank in which the plant protection agents(s) and/or the nutrient(s) is/are stored. By means of a pump, the contents of the tank are transported to one or a plurality of nozzles via which the contents of the tank are applied while the agricultural machine moves over the field (cf. e.g. US 2014/0263731 A1). In this case, the plant protection agents are not applied in undiluted form; rather, they are applied after dilution with water or nutrients (liquid fertilizers). For this reason, the contents of the tank in application of plant protection agents consist predominantly of water. Liquid fertilizers are either mixed with this water, or in many cases, applied in undiluted form.

However, such an application device is highly inflexible, as only the pre-prepared mixture (contents of the tank) is available.

DE 102010018338 A1 discloses a spraying device for application of a spraying agent to plants that comprises a spraying agent container and an auxiliary spraying agent container. The auxiliary spraying agent can be mixed with the spraying agent by means of a dosing pump, so that either the spraying agent alone or the spraying agent together with the auxiliary spraying agent can be applied as needed. A problem with the application device disclosed in DE 102010018338 A1 is that large residual amounts of the spraying agent and auxiliary spraying agent remain in the lines. Residual amounts may need to be disposed of; the cost of cleaning the lines is considerable, and large amounts of residue usually entail unnecessary expense.

US 2014/0252111 A1 discloses an application device comprising a tank containing a flushing agent in addition to a product tank. The device is configured such that after application of a product, the lines can be rinsed with the flushing agent. Residual amounts are thus flushed away and neither collected nor recycled.

Based on the described prior art, therefore, the person having ordinary skill in the art is faced with the technical object of providing an application device which allows partial-area-specific application of one or a plurality of plant protection agents and/or nutrients and in which the amounts of residue and cleaning costs are minimized.

This object is achieved by means of the subject matters of the independent claims. Preferred embodiments are given in the dependent claims and the following description.

A first subject matter of the present invention is thus a method for application of a concentrate in diluted form, comprising the following steps:
transporting a concentrate from a concentrate container through one or a plurality of concentrate lines in the direction of at least one outlet,
diluting the concentrate with a diluent and
applying the concentrate diluted with the diluent,
wherein after an application, at least a portion of the residual amounts of concentrate remaining in the concentrate lines is recycled to the concentrate container.

A further subject matter of the present invention is a device for application of a concentrate in diluted form, comprising:
at least one concentrate container comprising a concentrate, or means for connecting at least one concentrate container comprising a concentrate to the device,
a container comprising a diluent for diluting the at least one concentrate,
at least one outlet,
transporting means for transporting the at least one concentrate from its concentrate container in the direction of the at least one outlet,
one or a plurality of concentrate lines through which the at least one concentrate passes when it is transported from its concentrate container in the direction of the at least one outlet,
transporting means for transporting the diluent from its container in the direction of the at least one outlet,
a mixing element for mixing the at least one concentrate with the diluent and
means for recycling residual amounts of concentrate remaining in the concentrate lines after an application to the concentrate container from which the concentrate was removed.

A further subject matter of the present invention relates to use of the device according to the invention in the area of agriculture, in particular for treating cultivated plants with plant protection agents and/or nutrients.

The invention is described in further detail below without distinguishing among the subject matters of the invention (device, method, use). Rather, the following explanations are to apply to all subject matters of the invention analogously, regardless of the context in which they occur (device, method, use).

According to the invention, one or a plurality of plant protection agents and/or nutrients is/are present in concentrate form (as a concentrate) before being diluted with a diluent and applied in diluted form.

The term "plant protection agents" is understood to refer to an agent that is used for protecting plants or plant products from harmful organisms or preventing the action thereof, destroying unwanted plants or plant parts, inhibiting the unwanted growth of plants or preventing such growth, and/or in another manner as nutrients for affecting the physiological processes of plants (e.g. growth regulators).

Examples of plant protection agents are herbicides, fungicides. insecticides and growth regulators.

A plant protection agent ordinarily contains an active compound or a plurality of active compounds. The term "active compounds" refers to substances that have a specific action and induce a specific reaction in an organism. Ordinarily, a plant protection agent contains a carrier substance for diluting the one r plurality of active compounds. In addition, additives such as preservatives, buffers, dyes and the like are conceivable.

Growth regulators are used for example for increasing the stability of grain by shortening the stem length (stem shorteners, or more precisely internode shorteners), improving the rooting of cuttings, reducing plant height by compression in horticulture or preventing the germination of potatoes. They are ordinarily phytohormones or synthetic analogs thereof.

The term "nutrients" refers to those inorganic and organic compounds from which the plants can extract the nutrients from which their bodies are constructed. These elements themselves are often referred to as nutrients. Depending on the location of the plant, the nutrients are taken from the air, water, and soil. These are usually simple inorganic compounds such as water ($H_2O$) and carbon dioxide ($CO_2$) and ions such as nitrate ($NO_3$), phosphate ($PO_4^3$) and potassium ($K^+$). The availability of these nutrients varies. It depends on the chemical behavior of the nutrient and the site conditions. As the nutrient elements are required in specified proportions, the availability of an element ordinarily limits the growth of the plants (minimum law extensively described by Justus von Liebig). If one adds this element, growth increases. In addition to the core elements of organic matter (C, O, H, N and P), K, S, Ca, Mg, Mo, Cu, Zn, Fe, B, Mn, and Cl, and in higher plants, Co and Ni are of vital importance. The individual nutrients may be present in the form of various compounds; for example, nitrogen can be added in the form of a nitrate, ammonia or an amino acid.

A plant protection agent to be applied and/or a nutrient to be applied is also referred to in this description as an application agent.

The application agent is initially present in a container as a concentrate. The concentrate is preferably a liquid.

The concentrate is preferably an active ingredient concentrate. The term active ingredient concentrate is understood to refer to the formulation of an active ingredient that is present in concentrated form and must/is to be diluted prior to use.

The device according to the invention preferably comprises a plurality of containers, each containing a concentrate. There are preferably 1 to 10 containers containing concentrates.

Each container may contain a different concentrate; however, it is also conceivable for the same concentrate to be contained in a plurality of containers.

Preferably, the concentrate is contained in an interchangeable cartridge. In such a case, the cartridge and the device have mutually compatible means with which the cartridge can be reversibly connected to the device so that the concentrate contained in the cartridge can be transported from the cartridge into the device. For example, such means can be a screw or bayonet connection.

The cartridge is interchangeable, which means that it can be connected to the spraying device and then removed. Preferably, it is then again removed and optionally replaced with a different or new cartridge after it has been emptied. However, it can also be removed when it has not yet been emptied. Both the cartridge and the device are configured as functional units so that their use is safe for the user and the environment.

The cartridge is configured so that it is impermeable for the concentrate and cannot be chemically attacked by the concentrate.

Preferably, the cartridge is at least partially composed of plastic. Plastics are known for their property of being chemically inert with respect to many substances. They are also light, have favorable workability, and can be molded into virtually any desired shape.

The cartridge can be configured as a disposable container or a reusable container; that is, in an embodiment of the present invention, the cartridge can be refilled, and in an alternative embodiment, it is disposed of after emptying.

In a preferred embodiment, the concentrate container comprises a memory unit. Data on the concentrate in the concentrate container and on the use thereof can be stored in the memory unit, For example, data can be stored on the diluent with which the concentrate is to be diluted, the degree of dilution at which the concentrate is to be mixed with a diluent and/or the flushing agent with which the concentrate lines are to be flushed. The maximum unit amounts per unit area depending on the cultivated crop and the indication can also be stored, so that proper use can be ensured and the possibility of erroneous use ruled out.

The memory unit can be an optical code (barcode, 2D code or the like).

It is preferably a memory unit whose contents can be modified, i.e., data can not only be read out of the memory unit but also written into the memory unit. Examples of writable memory units are a magnetic memory and a semiconductor memory. The memory unit is preferably a semiconductor memory.

Reading from and/or writing into the memory unit can be carried out on a non-contact basis (such as e.g. in RFID technology or near-field communication) or a contact basis such as e.g. a debit card, a compact flash drive or a USB stick).

In a preferred embodiment, data on the type and amount of the concentrate in the concentrate container are stored in the memory unit. The term "type" is to be understood as referring to all data that allow a conclusion to be drawn as to the contents of the concentrate container. A product name, a reference number or an identification number of the concentrate can be stored. The composition of the concentrate can be stored. Data on the active compound contained in the concentrate and the composition thereof can be stored.

Preferably, the data stored in the memory unit on the amount of concentrate in the concentrate container are kept updated. For example, it is conceivable that the amount of concentrate removed from the container during an application is recorded and that the residual amount remaining in the container after the application is calculated based on this and recorded in the memory unit. It is conceivable in determining the residual amount remaining in the concentrate container to take into account the amount of concentrate that is recycled to the concentrate container in a flushing step following application.

The device according to the invention further comprises a container comprising a diluent. The diluent is used for mixing the diluent with the concentrate, thus achieving dilution of the concentrate before it is applied in diluted form.

The diluent, like the concentrate, is preferably a liquid. The term "liquid" also includes solutions, emulsions and suspensions.

In a preferred embodiment, the diluent is water.

In a further preferred embodiment, the diluent contains one or a plurality of nutrients. In this case, the concentrate, which preferably contains one or a plurality of plant protection agents, is diluted with the diluent, which contains one or a plurality of nutrients.

It is also conceivable for the device according to the invention to comprise a plurality of containers containing a diluent. It is conceivable for the same diluent to he contained in a plurality of containers; however, it is also conceivable for a different diluent to be contained in each container.

It is conceivable that the diluent container is equipped with a memory unit. Data on the diluents contained in the diluent container can be stored in the memory unit. The data on the diluent and the use thereof stored in the memory unit can be analogous or similar to the data on the concentrate stored in the memory unit of the concentrate container, e.g. the type, amount, concentration of ingredients, regulations for use, restrictions on use, compatibility with concentrates and/or flushing agents and the like.

The device according to the invention comprises at least one outlet. The concentrate is transported from its container in the direction of the at least one outlet. Transporting means are available for this purpose. For example, the concentrate can be transported from its container in the direction of the outlet by means of a pump. It is also conceivable to subject the concentrate to positive pressure so that the concentrate is transported by this pressure from its container in the direction of the outlet.

Preferably, the device according to the invention comprises a plurality of outlets. The number of outlets corresponds to the number of outlets of vehicles for applying plant protection agents and/or nutrients that are currently usable or will be usable in the future. For both vehicles that are currently useable and those that will be usable in the future, the number depends on the working width of these vehicles and the distances of the outlets from one another. There are ordinarily 10 to 100 outlets; however, the number can also be larger or smaller. The outlets are preferably composed of spray nozzles with which the diluted application agent can be applied in drop form.

Preferably, the outlets/spray nozzles are attached to a distributor arm and evenly distributed over the length of the distributor arm, as is ordinarily the case in application devices for use in agriculture (cf. e.g. US 2014/0263731 A1 and US 2014/0252111 A1).

The concentrate is applied in diluted form. For this purpose, the concentrate must be mixed with the diluent. Mixing of the concentrate and the diluent is preferably carried out using a mixing element. A mixing element ordinarily comprises an inlet for the concentrate, an inlet for the diluent and an outlet for the mixture of the concentrate and the diluent.

In principle, it is possible to combine the diluent and the concentrate in the outlet (e.g. in the spray nozzle). In many cases, however, simply combining the diluent and the concentrate in a spray nozzle does not allow sufficient mixing of the components to be achieved. Preferably, mixing of the diluent and concentrate is therefore carried out in a mixing chamber located upstream of the outlet in the flow direction of the concentrate and the diluent.

The mixing chamber can comprise static mixing elements (static mixers) in order to achieve improved mixing of the components. The purpose is to achieve a homogeneous mixture of the concentrate and the diluent. "Homogeneous"

means that any two random samples of the mixture show the same concentration of concentrate in the diluent within the error tolerances.

In a preferred embodiment, the concentrate is injected into the flow of the diluent. This direct injection creates turbulence of the concentrate in the diluent, which leads to better mixing.

According to the invention, the residual amounts remaining in the lines after an application process are to be maintained at low levels. In particular, the residual amounts of diluted concentrate in the lines of the device are to be maintained at low levels. The mixing of the concentrate with the diluent is therefore preferably carried out in a mixing chamber located "immediately upstream of the outlet" in the flow direction of the concentrate.

"Immediately upstream of the outlet" means that the line volume between the mixing chamber and the outlet (dead volume) is less than 200 mL, preferably less than 150 mL, even more preferably less than 100 mL, even more preferably less than 80 mL, even more preferably less than 70 mL, even more preferably less than 60 mL, and even More preferably less than 50 mL.

In a preferred embodiment, a mixing chamber is also connected upstream of each outlet. However, it is also conceivable to mix the concentrate and diluent in a central mixing chamber and-to transport the mixture from the central mixing chamber in the direction of the plurality of outlets. It is also conceivable for a plurality of mixing chambers to be present, wherein a plurality of outlets is supplied by each individual mixing chamber. Further variants are conceivable.

In the case of a plurality of concentrate containers containing different concentrates that are to be applied in parallel, the concentrates can be transported independently of one another into one or a plurality of mixing chambers in which they are jointly mixed with the diluent. It is also conceivable for different concentrates to first be combined and then jointly mixed with a diluent. The different concentrates can be combined in one concentrate line; however, it is also conceivable to use one or a plurality of mixing chambers in which different concentrates are first mixed before they are transported to one or a plurality of further mixing chambers in which the mixture is diluted with one or a plurality of diluents.

In a mixing chamber, both the concentrate and the diluent are fed in via corresponding lines. The lines via which the concentrate is conveyed from its container into a mixing chamber are also referred to here as concentrate lines. Accordingly, the lines via which the diluent is conveyed from its container into a mixing chamber are also referred to as diluent lines. When the term "line" is used in the present description, this also includes the term "line section." Line and line section are used synonymously.

After an application, residual amounts of concentrate remain in the concentrate lines, residual amounts of diluent remain in the diluent lines and diluted concentrate (a mixture of concentrate and diluent) remains in the mixing chamber and in the lines between the mixing chamber and the outlet.

According to the invention, at least a portion of the residual amounts of concentrate remaining in the concentrate lines after an application is recycled to the concentrate container so that it can be reused.

In a preferred embodiment, separate concentrate lines lead from each concentrate container to the mixing elements. As the concentrate and diluent are combined in the mixing elements "immediately upstream of an outlet," as described above, the amount of diluted concentrate located between the mixing elements and the outlets is minimal. The residual amounts remaining in the concentrate lines are pure concentrate that can be recycled to the concentrate container and reused. The amount depends in particular on the length of the line. The recycling process is therefore adapted to this circumstance with respect to time and/or design. In this embodiment, the entire residual amounts of concentrate remaining in the concentrate lines are preferably recycled to the respective concentrate container.

In a further preferred embodiment, it is possible for the residual amounts of concentrate remaining in the concentrate lines after an application to he recycled to the concentrate container and/or transported to one or a plurality of collecting containers. In this case, in addition to the concentrate containers, there are also one or a plurality of separate collecting containers that can take up residual amounts of concentrate. This embodiment is particularly advantageous in cases where there is a plurality of concentrate containers with different concentrates and different concentrates share at least a portion of the concentrate lines (joint concentrate lines). As long as only one type of concentrate is applied during an application, it can be recycled to the respective concentrate container after the application. If different concentrates are applied in parallel during an application, residual amounts of various concentrates will remain in the joint concentrate lines. These mixtures should not be transported to a concentrate container comprising otherwise pure concentrate. These mixtures should be transported to one or a plurality of separate collecting containers so that they can be safely stored therein and optionally later processed and reused or safely disposed of.

It is conceivable that the collecting containers present are also equipped with a memory unit. For example, data on the type and amount of concentrates, concentrate mixtures, flushing agents and/or mixtures of said substances contained in the respective collecting container can be stored in the memory unit.

It is conceivable to supply the substances that have been transported into a collecting container to an application at a later time. In such a case, corresponding transporting means are present in order to convey the substances contained in a collecting container in the direction of one or a plurality of outlets.

In a preferred embodiment, the device according to the invention is equipped with one or a plurality of containers containing one or a plurality of flushing agents. It is conceivable to have a plurality of containers containing the same flushing agent; however, it is also conceivable to have a plurality of containers containing different flushing agents.

A flushing agent can be gaseous or liquid.

It is conceivable that the flushing agent container is equipped with a memory unit. Data on the flushing agent contained in the flushing agent container can be stored in the memory unit. The data on the flushing agent and use thereof stored in the memory unit can be analogous or similar to the data on the concentrate stored in the memory unit of the concentrate container, e.g. the type, amount, concentration of ingredients, regulations for use, restrictions on use, compatibility with concentrates and/or diluents and the like.

It is also conceivable that the diluent is also used for flushing in addition to dilution of the concentrate. In such a case, from a technical standpoint, one could dispense partially or completely with the separate flushing agent container or filling thereof with the flushing agent. The diluent container could then also function as a flushing agent container.

A flushing agent is used primarily for removing residual amounts of concentrate from the concentrate lines. Accordingly, the flushing agent can be used to recycle concentrate from the concentrate lines into a concentrate container and/or to convey concentrate from the concentrate lines into one or a plurality of separate collecting containers. In a further preferred variant, the concentrate is first recycled into the corresponding concentrate container and the concentrate line is then flushed with the flushing agent, wherein the flushing agent is then collected in a separate collecting container.

In a preferred embodiment, a flushing agent is used in order to recycle residual amounts of concentrate after an application to the concentrate container. For this purpose, a flushing agent container is connected via flushing agent lines to the concentrate line.

In a flushing process, the flushing agent flows from the flushing agent container through the flushing agent lines into the concentrate lines and transports the concentrate located in the concentrate lines back into the concentrate container.

In this process, more or less thorough mixing of the flushing agent and concentrate takes place at the interface between the flushing agent and concentrate. As a rule, this mixing is more thorough with increasing distance covered by the flushing agent and the concentrate when the concentrate is conveyed by the flushing agent back into the concentrate container. The flow rate also affects the degree of mixing; for example, a laminar flow results in more thorough mixing than a plug flow.

In the recycling of concentrate from the concentrate lines to the concentrate container by means of a flushing agent, there are various possibilities for process control that will he described in further detail below, each of which constitutes an individual embodiment of the present invention.

In one case, there is a plurality of concentrate containers containing different concentrates in parallel. The concentrates share several concentrate lines (joint concentrate lines). Only one concentrate is applied. The application is completed; only residual amounts of the concentrate remain in the concentrate lines. The flushing agent is transported into the concentrate lines only until the residual amounts of concentrate remaining in the joint concentrate lines are removed therefrom, In this process, the concentrate remaining in the joint concentrate lines is first transported into the concentrate lines that do not share the concentrate with other concentrates (individual concentrate lines), and then transported from there into the concentrate container. Depending on the volume of the individual and joint concentrate lines and the degree of mixing of the concentrate and flushing agent, it is conceivable that no flushing agent will get into the concentrate container during this process. The joint concentrate lines are free of concentrate, and it is possible to initiate an application with another concentrate without including residue of the previous concentrate in the application. A mixture of the flushing agent and the concentrate remains only in the individual concentrate line. On renewed application of the first concentrate, the mixture of the flushing agent and the concentrate is first transported from the concentrate line in the direction of the outlet. As the different line volumes are known, the amount of the flushing agent located in the individual concentrate line can be calculated so that this amount can be taken into consideration in setting the degree of dilution of the concentrate in the diluent. It is conceivable for the data on the amount of the flushing agent and concentrate remaining in the concentrate line to he recorded after the application in a memory unit, preferably in the memory unit of the concentrate container, so that these data can be used in a subsequent application in order to correctly set the degree of dilution. However, it is also conceivable to transport the concentrate from the concentrate lines back into the cartridge and then to clean the concentrate lines using a flushing agent, wherein the resulting mixture of the flushing agent and residual amounts of concentrate is transported into one or a plurality of collecting containers.

In another case, there can be one or a plurality of concentrate containers containing one or a plurality of concentrates in parallel. Only one concentrate is applied. The application is completed; residual amounts of the concentrate remain in the concentrate lines. A flushing agent is used in order to remove the concentrate from the concentrate lines. The flushing agent is transported from the flushing agent container through the flushing agent lines and reaches the concentrate lines. With the aid of the flushing agent, the concentrate remaining in the concentrate lines is transported back into the corresponding concentrate container. During this process, there is more or less thorough mixing of the concentrate and flushing agent at the interface between the concentrate and flushing agent. In this case, however, the goal is to recycle the entire residual amount of concentrate into the concentrate container, This causes the flushing agent to get into the concentrate container. The amount of flushing agent that gets into the concentrate container during a flushing process is determined. This amount modifies the composition of the concentrate in the concentrate container and thus for example leads to a modified concentration of the active compound contained in the concentrate. Preferably, the modified composition of the concentrate is determined and recorded in a memory unit, preferably in the memory unit connected to the concentrate container. This makes it possible to take into account the modified composition in subsequent application in order to set the degree of dilution of the concentrate with a diluent. In this process, the flushing agent used is adapted to the respective concentrate, Possible short, medium or long-term separation in the concentrate container is constructively taken into consideration so that on subsequent use of the then more or less diluted concentrate, a homogeneous mixture of the concentrate and flushing agent is transported to the mixing chamber.

In a further case, there is also a plurality of concentrate containers containing different concentrates in parallel. The concentrates share several concentrate lines/line sections (joint concentrate lines); however, there are also concentrate lines (line sections) that are intended for only one concentrate each (individual concentrate lines). A plurality of concentrates is applied in parallel. The application is completed; residual amounts of different concentrates remain in the joint concentrate lines. Residual amounts of the respective pure concentrates remain in the individual concentrate lines. A flushing agent is used to remove residual amounts of concentrate from the joint concentrate lines. In order to avoid contaminating the concentrate containers with foreign concentrates, the residual amounts remaining in the joint concentrate lines are transported to one or a plurality of separate collecting containers (different from the concentrate containers). The residual amounts of concentrate remaining in the individual concentrate lines are transported with the flushing agent hack into the respective concentrate containers.

Mixed forms of the above cases are also conceivable and are also subject matter of the present invention.

In particular, in cases where the flushing agent gets into a concentrate container, it must be compatible with the concentrate, i.e., it should cause only dilution of the concentrate in the concentrate container. For example, it must not cause an active compound present in the concentrate to precipitate. In a preferred embodiment, the flushing agent is water. In another preferred embodiment, the concentrate is an active ingredient formulation, and the flushing agents are at least partially the same substances that were used for producing the active ingredient formulation, wherein the active compound is (of course) not included.

In a preferred embodiment, air, nitrogen or another gas or gas mixture is used as a flushing agent. By means of the gaseous flushing agent, residual amounts of concentrate are removed from the concentrate lines. In this process, at least a portion of the residual amounts of concentrate is recycled to the respective concentrate container from which the concentrate was removed. It is conceivable first to use a gaseous flushing agent in order to recycle residual amounts of concentrate to the respective concentrate containers, and then to flush/clean the concentrate lines by means of a liquid flushing agent in order to remove residual amounts remaining on the walls of the lines. It is conceivable that during this process, a gaseous flushing agent may get into a concentrate container. Preferably, the concentrate container is therefore equipped with means for releasing the gaseous flushing agent via a valve, e.g. through a scrubber (for removing residual amounts of concentrate if an aerosol of the flushing agent and concentrate has formed), into the environment. The use of a gaseous flushing agent for recycling residual amounts of concentrate from the concentrate lines to the respective concentrate containers would be advantageous in that there would be no dilution of the concentrate in the concentrate container if the gaseous flushing agent does not dissolve in the concentrate in a considerable degree.

In an embodiment, the flushing agent lines are optionally connected to the concentrate lines via one or a plurality of valves. The flushing agent lines preferably meet the concentrate lines in the vicinity of the outlet and/or the mixing chamber.

In a further embodiment, the flushing agent lines are optionally connected to the mixing chambers via one or a plurality of valves. Preferably, the flushing agent can be used to remove residual amounts of concentrate both from the mixing chamber and the concentrate lines.

In a further embodiment, a flushing line leads to each mixing chamber.

In a further embodiment, the flushing agent lines optionally lead via one or a plurality of valves to the concentrate lines, wherein the number of the flushing agent lines that meet one or a plurality of concentrate lines is the same as the number of concentrate containers.

In a further preferred embodiment, the device according to the invention is equipped with means for determining the type and amount of the concentrate/application agent applied, in particular in cases where the concentrate/application agent is a plant protection agent. It is conceivable that the farmer is required to keep records of the amounts of plant protection agents applied. Preferably, these amounts are automatically determined and recorded in a memory unit that is preferably connected to a computer network so that the recorded data can be further processed, and optionally electronically transmitted to the authorities.

The invention is explained in further detail below by means of examples, without intending to limit the invention to the examples.

FIG. 1 shows a schematic view of a preferred embodiment of a device according to the invention. The device comprises a container (1) with a diluent. There are three concentrate containers (2) comprising different concentrates. Each of the concentrate containers (2) has a memory unit (8). Moreover, there is a flushing agent container (3) with a flushing agent. The diluent container (1) is connected via diluent lines to eight mixing chambers (6). The concentrate containers (2) are also connected via concentrate lines to the eight mixing chambers (6). There are line sections that share the three different concentrates (joint concentrate lines (5)) and line sections intended for only one concentrate each (individual concentrate lines). The flushing agent container (3) is also connected via flushing agent lines to the eight mixing chambers (6), Each of the eight mixing chambers (6) leads to a spray nozzle (7) by means of which the contents of the mixing chamber can be applied in drop form.

One or a plurality of concentrates can be successively or simultaneously transported from the respective concentrate containers in the direction of the mixing chambers (6). Similarly, diluents can be transported from the diluent container (1) in the direction of the mixing chambers (6). The concentrate or concentrates is/are injected in the mixing chambers (6) into the stream of the diluent so that the concentrate and diluent are mixed in the mixing chambers and form a homogeneous mixture. In this process, the concentrate or concentrates is/are diluted with a diluent. The diluted concentrate(s) leave the device via the spray nozzles. Pressure regulators (4) are used to regulate the volume flows of the concentrate and diluent according to the desired dilution ratio and the desired outlet flow volume.

The amounts of concentrate contained in the concentrate containers are stored in the memory units (8). When concentrates are removed from the concentrate containers, the amounts removed are detected and the amounts of concentrate remaining in the concentrate containers are determined. The amounts of concentrate remaining in the concentrate containers are recorded in the storage media.

After an application, residual amounts of diluted concentrates remain in the mixing chambers. Residual amounts of concentrate remain in the individual and joint concentrate lines. Residual amounts of concentrate can he removed from the lines using a flushing agent. Preferably, at least a portion of the residual amounts of concentrate is recycled to one or a plurality of concentrate containers in this process. The storage media are updated accordingly so that the amounts of concentrate available in the respective concentrate containers are continuously recorded in the storage media.

The remaining residual amounts in the mixing chambers and spray nozzles can be transported by the flushing agent into a separate collecting container or can be properly and professionally applied to the field. As described above, however, the cleaning results in sharply reduced residual amounts applied to the field, as the distance between one or a plurality of mixing elements and one or a plurality of outlets (spray nozzles) is minimized according to the invention.

Figure 2:
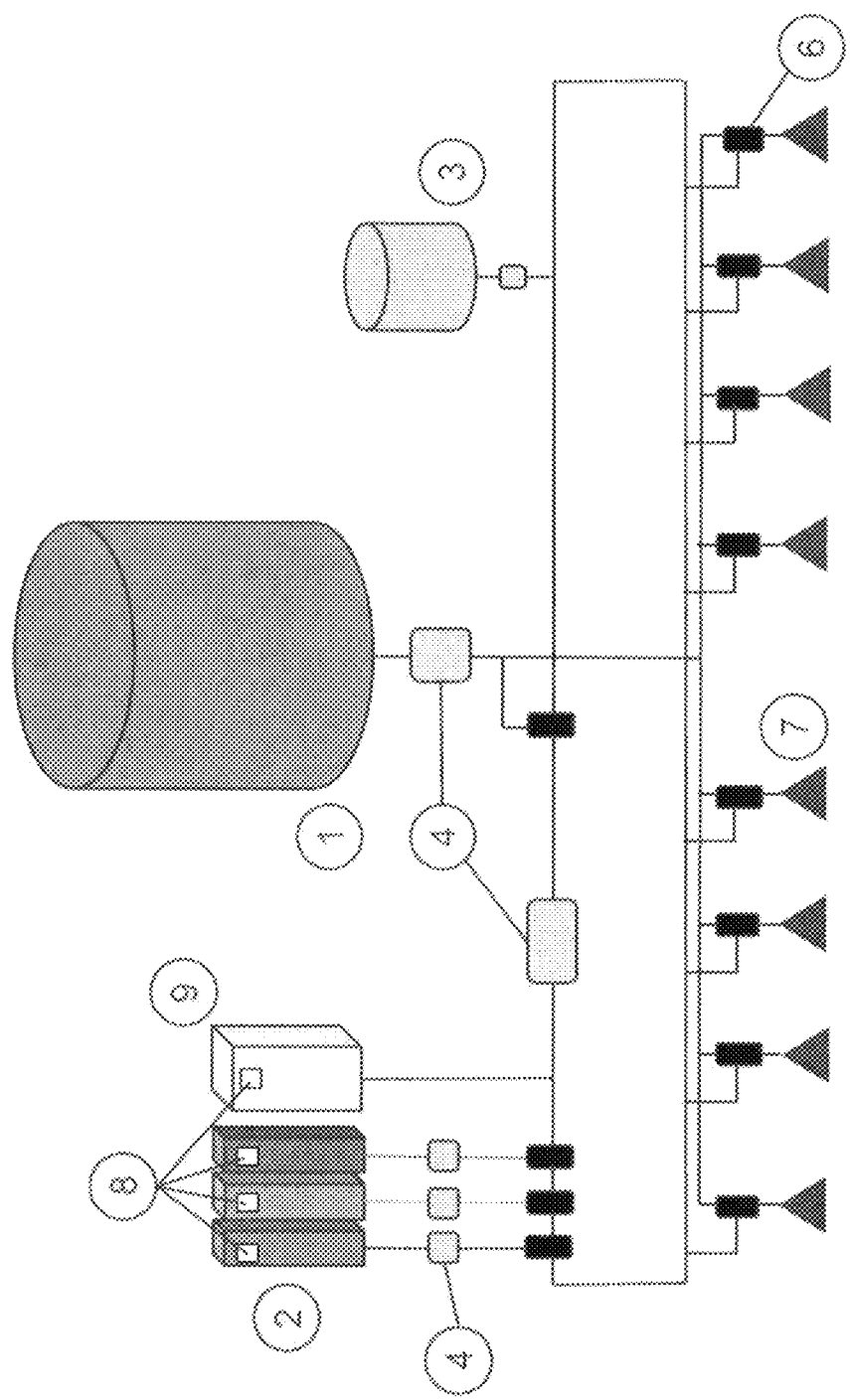

FIG. 2 shows a schematic view of a further preferred embodiment of a device according to the invention. The device comprises a container (1) with a diluent. There are three concentrate containers (2) comprising different concentrates. Each of the concentrate containers (2) has a memory unit (8). Moreover, there is a flushing agent container (3) containing a flushing agent. The diluent container (1) is connected via diluent lines to eight mixing chambers (6). The concentrate containers (2) are also connected via concentrate lines to the eight mixing chambers (6). There are line sections that share the three different concentrates (joint concentrate lines) and line sections intended for only one concentrate each (individual concentrate lines). The flushing agent container (3) is also connected via flushing agent lines to the eight mixing chambers (6). Each of the eight mixing chambers (6) leads to a spray nozzle (7) by means of which the contents of the mixing chamber can be applied in drop form.

There are also further mixing chambers by means of which the different concentrates can be mixed with one another before the mixtures are diluted with a diluent in the mixing chambers immediately upstream of the outlets. There is also a central mixing chamber that is connected upstream of the mixing chambers located immediately upstream of the outlets and by means of which the diluent can be mixed with one or a plurality of concentrates.

Pressure regulators (4) are used to regulate the volume flows of the concentrate and diluent according to the desired dilution ratio and the desired outlet flow volume.

There is a collecting container (9) into which the residual amounts can be transported from the lines. The collecting container (9) is also provided with a memory unit (8). Data on the substances contained in the respective containers are stored in the memory units (8).

The invention claimed is:

1. A method for application of a concentrate in diluted form, comprising the following steps:
    transporting a concentrate from at least one concentrate container through one or a plurality of concentrate lines in the direction of at least one outlet,
    diluting the concentrate with a diluent and
    applying the concentrate diluted with the diluent,
    wherein after an application, at least a portion of residual amounts of concentrate remaining in the concentrate lines is recycled to the at least one concentrate container, and wherein the residual amounts remaining in the at least one concentrate container after an application are determined and recorded in a memory unit that is connected to the respective at least one concentrate container.

2. The method according to claim 1, wherein there are a plurality of concentrate containers comprising different concentrates, wherein the different concentrates can be transported via concentrate lines in the direction of the at least one outlet, wherein after an application of an individual concentrate, the residual amounts of the individual concentrate remaining in the concentrate lines are recycled to the corresponding concentrate container.

3. The method according to claim 1, wherein there are a plurality of concentrate containers comprising different concentrates, wherein the different concentrates can be transported via concentrate lines in the direction of the at least one outlet and can flow both through joint concentrate lines that they share with at least one further concentrate or through individual concentrate lines that they do not share with a further concentrate, wherein after an application of a plurality of concentrates, the residual amounts of the respective concentrate remaining in the individual concentrate lines are recycled to the corresponding concentrate container, and the residual amounts of concentrate remaining in the joint concentrate lines are optionally recycled to one or a plurality of collecting containers.

4. The method according to claim 1, wherein a flushing agent is used for recycling concentrate to the at least one concentrate container.

5. The method according to claim 1, wherein the residual amounts of concentrate remaining in the concentrate lines are recycled by a gaseous flushing agent to the at least one concentrate container from which the respective concentrate was removed, and the concentrate lines are then cleaned by means of a liquid flushing agent.

6. The method according to claim 1, wherein the recycled amounts of concentrate are taken into consideration in determining the residual amounts of concentrate.

7. The method according to claim 1, wherein in recycling concentrate to the at least one concentrate container, flushing agent gets into the at least one concentrate container, wherein the amount of flushing agent that gets into the at least one concentrate container is determined and the composition of the concentrate in the at least one concentrate container that has been modified by the flushing agent is determined and data thereon are written into a memory unit that is connected to the respective at least one concentrate container.

8. The method according to claim 1, wherein the concentrate is an active ingredient formulation that is applied to a field in which cultivated plants are grown.

9. The method according to claim 1, wherein the concentrate comprises a plant protection agent selected from one or more of (an herbicide, a fungicide, or an insecticide.

10. The method according to claim 1, wherein a diluent is present that comprises one or a plurality of nutrients for cultivated plants.

11. A device for application of a concentrate in diluted form, comprising:
    at least one concentrate container comprising a concentrate, or means for connecting at least one concentrate container comprising a concentrate to the device,
    a container comprising a diluent for diluting the at least one concentrate,
    at least one outlet,
    transporting means for transporting the at least one concentrate from the at least one concentrate container in the direction of the at least one outlet,
    one or a plurality of concentrate lines through which the at least one concentrate passes when it is transported from the at least one concentrate container in the direction of the at least one outlet,
    at least one pressure regulator to regulate volume flows of the diluent from its container in the direction of the at least one outlet,
    a mixing element for mixing the at least one concentrate with the diluent and
    means for recycling residual amounts of concentrate remaining in the concentrate lines after an application to the at least one concentrate container from which the concentrate was removed, and
    at least one memory unit connected to the respective at least one concentrate container to determine and record the residual amounts remaining in the at least one concentrate container after an application.

12. The device according to claim 11, comprising a memory unit in which the residual amount of concentrate remaining in the respective at least one concentrate container after an application of a concentrate, including the recycled amount of concentrate, is stored.

13. The device according to claim 11, wherein the means for recycling comprises a flushing agent container comprising a flushing agent by which the residual amounts of concentrate remaining in the concentrate lines after an application can be recycled to the corresponding at least one concentrate container, wherein the composition of the concentrate in the at least one concentrate container modified by addition of the flushing agent is stored.

14. A method for application of a concentrate in diluted form, comprising the following steps:

transporting a concentrate from a plurality of concentrate containers through one or a plurality of concentrate lines in the direction of at least one outlet,
diluting the concentrate with a diluent and
applying the concentrate diluted with the diluent,
wherein after an application, at least a portion of residual amounts of concentrate remaining in the concentrate lines is recycled to the plurality of concentrate containers, wherein the plurality of concentrate containers comprise different concentrates, wherein the different concentrates can be transported via concentrate lines in the direction of the at least one outlet and can flow both through joint concentrate lines that they share with at least one further concentrate or through individual concentrate lines that they do not share with a further concentrate, wherein after an application of a plurality of concentrates, the residual amounts of the respective concentrate remaining in the individual concentrate lines are recycled to the corresponding concentrate container, and the residual amounts of concentrate remaining in the joint concentrate lines are optionally recycled to one or a plurality of collecting containers.

* * * * *